Oct. 12, 1971    T. O. PAINE, ACTING    3,611,801
ADMINISTRATOR OF THE NATIONAL AERONAUTICS
AND SPACE ADMINISTRATION
RESPIRATION MONITOR

Filed Oct. 28, 1968      2 Sheets-Sheet 1

INVENTORS
ROBERT J. FAGOT
ROBERT T. McDONALD
JAMES A. ROMAN

BY

ATTORNEY

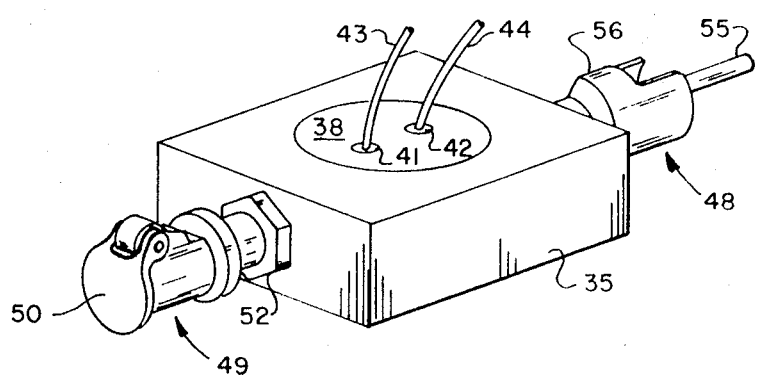
FIG 3
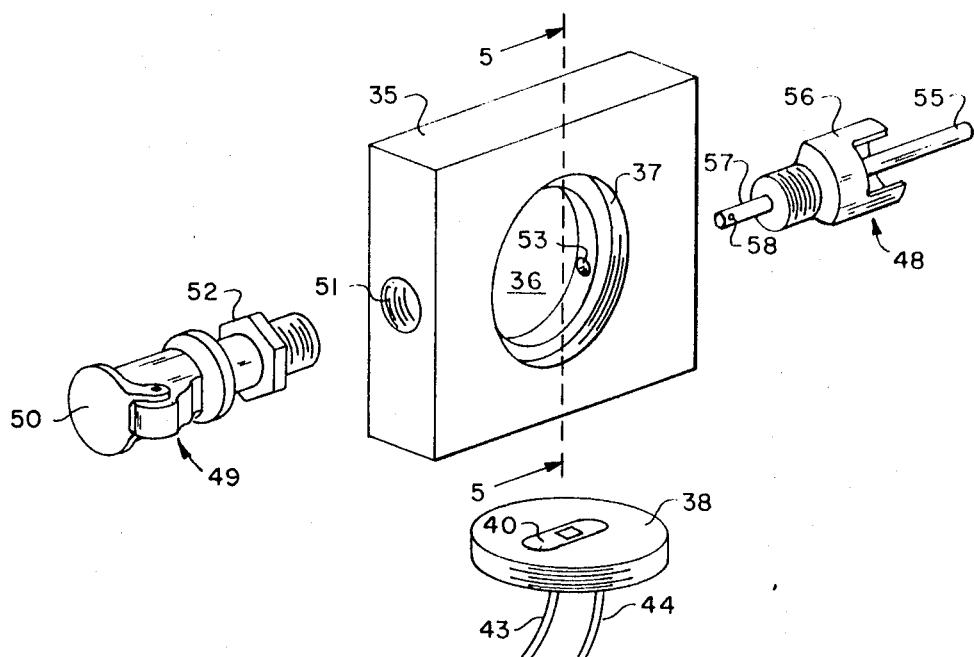
FIG 4
FIG 5
INVENTORS
ROBERT J. FAGOT
ROBERT T. McDONALD
JAMES A. ROMAN
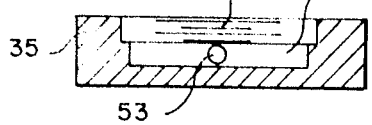
ATTORNEY

United States Patent Office 3,611,801
Patented Oct. 12, 1971

3,611,801
RESPIRATION MONITOR
T. O. Paine, Acting Administrator of the National Aeronautics and Space Administration, with respect to an invention of Robert J. Fagot and Robert T. McDonald, both of Littlerock, Calif., and James A. Roman, Vancouver, Wash.
Filed Oct. 28, 1968, Ser. No. 771,216
Int. Cl. G01f 1/04
U.S. Cl. 73—194 A                  5 Claims

ABSTRACT OF THE DISCLOSURE

A respiration monitor which may be inserted directly into a high-pressure oxygen line is provided by a capped tube adapted to be connected to a source of oxygen under pressure. A hole on the side of the tube allows oxygen to escape into a sealed chamber having an outlet port adapted to be connected to a face mask through a regulator. A microphone placed opposite the hole detects turbulence created by oxygen turning 90° to escape. A signal from the microphone is conditioned to derive desired information, such as respiration rate and total breaths.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; USC 2457).

BACKGROUND OF THE INVENTION

(1) Field of the invention

This invention relates to a fluid flow monitor, and more particularly to an improved transducer for monitoring air or oxygen in a respiration system.

(2) Description of the prior art

It is sometimes desirable to monitor respiration rate such as in aircraft environments. However, transducers available for that purpose have not been entirely satisfactory. They include: an expandable chest strap with a dimensional transducer; a thermistor placed in front of either nostril; a heated thermocouple placed in the passage for the inhaled air or oxygen; and an impedance pneumograph. The chest strap has the advantage of simplicity, but it is exceedingly sensitive to subject motion and therefore is not usable when the subject is active. The thermistor is normally heated to a temperature of a few degrees above ambient and its resistance changes are detected when it is cooled to different temperatures by fluctuations in the air or oxygen flow. Reasonably good results are achieved with a thermistor or a thermocouple, but implementation is difficult when very small power consumption is desired because the transducer temperature is then not much higher than the temperature of the air or oxygen being inspired. Thus, variations in ambient temperature may have a deleterious effect on sensitivity and may cause the signal to be lost. An impedance pneumograph is a bioimpedance transducer for indirect measurement of respiration through the relationship between respirator depth and thoracic impedance change. Therefore it is subject to motion or body posture, breathing mode, and other artifacts. Moreover, it requires attachment of biopotential electrodes which are apt to become detached from an active subject. Thus, there has been a need for the development of a simple and reliable transducer for monitoring respiration rate in an aircraft environment. Beyond that, there is a general need for such a transducer for use in many other environments requiring the monitoring of physiological fluid flow, such as in research and clinical environments.

Transducers for monitoring fluid flow have not been sufficiently accurate for use in physiological monitoring and other applications, and some unduly obstruct the free flow of fluid. A Pitot tube has been widely used to measure fluid velocity, but a well recognized disadvantage is that measurement is made of flow at only one point in the flow stream, usually the center where velocity is the greatest. Other transducers employ conduits which divert the fluid flow and gauges to detect deflection or deformation of the conduit resulting from the reactive force of the diverted fluid. While such transducers do not place a flow-restricting element in the fluid path, their sensitivity leaves a lot to be desired.

In still another type of transducer suggested by the prior art, the fluid flow is directed past a resonant cavity. Perturbations in the fluid stream caused by the edge of the cavity are reinforced by pressure waves reflected from the bottom of the cavity. A microphone is then placed over the flowing fluid downstream from the cavity. While good sensitivity to small changes in flow velocity is reported, the obvious disadvantage is that wide changes in flow rate (as would be experienced in, for example, a respiration system) would not be properly sensed. Moreover, it is reported that the response of such a transducer appears to be a function of molecular weight so that the limited range of detectable flow rate is different for each fluid.

OBJECTS AND SUMMARY OF THE INVENTION

An object of this invention is to provide an improved fluid flow transducer.

Another object is to provide an improved respiration monitor.

According to the invention, a sealed chamber is provided with inlet and outlet passages. The inlet passage is connected to a source of fluid and the outlet passage is connected to a fluid utilization device. A microphone is mounted in the sealed chamber. The direction of fluid flow is changed abruptly in the chamber toward the microphone to create turbulences which vary in magnitude as a function of flow rate. The microphone responds to the turbulences to produce an electrical signal, the amplitude of which varies as a function of the magnitude of the turbulences, and therefore as a function of the flow rate. Signal conditioning means are provided to derive desired information concerning fluid flow such as respiration rate and total breaths. To change the direction of flow toward the microphone in the chamber, a capped tube disposed along the face of the microphone is provided with an escape hole facing the microphone.

The novel features of the invention are set forth with particularity in the appended claims. The invention will best be understood from the following description when read in conjunction with the accompanying drawings.

BRIEF DESCRIPTION OF THE DRAWINGS

FIG. 3 is a perspective view of an assembled transducer in accordance with a preferred embodiment of this invention.

FIG. 4 is an exploded view of the transducer of FIG. 3.

FIG. 5 is a sectional view taken on the line 5—5 of FIG. 4.

DESCRIPTION OF THE PREFERRED EMBODIMENTS

Figure 1:
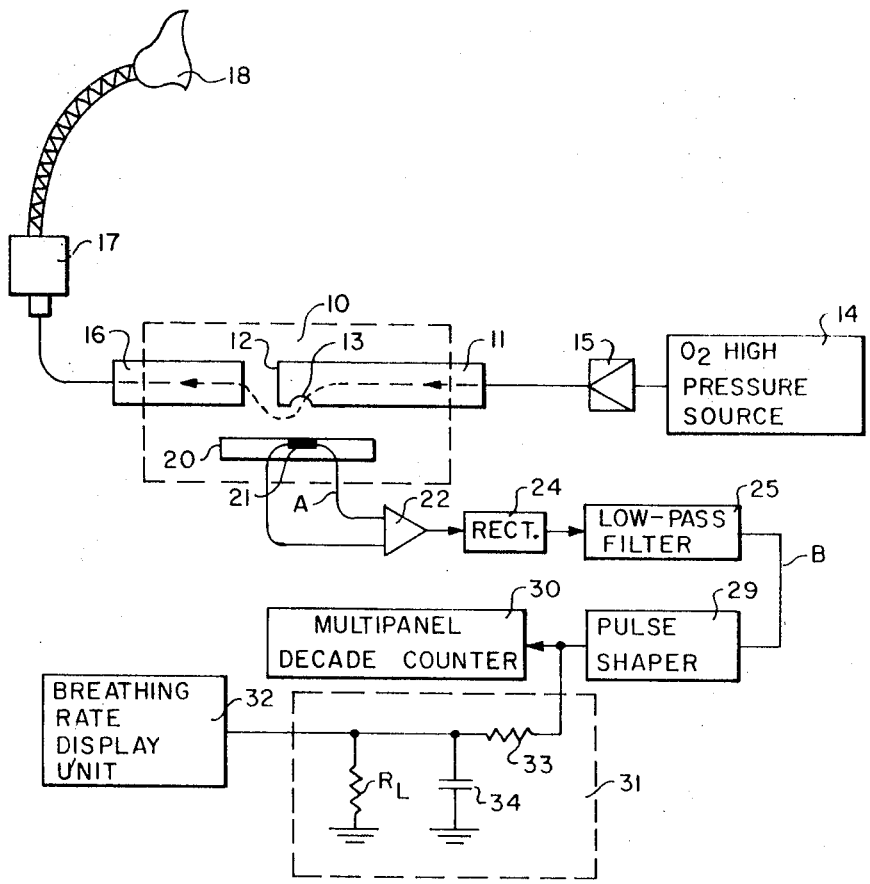
FIG. 1 is a schematic diagram of a fluid flow transducer in accordance with this invention and a block diagram of signal conditioning apparatus for use therewith in a respiration monitor.

In a preferred embodiment of the invention shown in the drawings, a sealed chamber 10 is provided with an inlet tube 11 having a capped end 12 and an escape hole 13 on the side. The inlet tube 11 is connected to a source 14 of oxygen under high pressure (about 2,000 p.s.i.) by a pressure regulator 15 which reduces pressure (down to about 75 p.s.i.). An outlet tube 16 open at both ends provides a passage of oxygen out of the chamber 10. A chest regulator 17 of the type customarily worn by pilots at high altitudes reduces the oxygen pressure down to near atmospheric pressure at a face mask 18. If the system is provided for use in flight, the "atmospheric pressure" is cockpit pressure.

A microphone 20 is placed in the chamber 10, preferably a subminiature ceramic microphone, with the diaphragm 21 thereof directly opposite the hole 13. As oxygen escapes from the tube 11, its direction of flow is changed by 90° toward the microphone. The turbulence created at the microphone diaphragm is detected and amplified by an amplifier 22. The direction of flow is again changed at the face of the microphone, as shown by a dotted line indicating flow path, thereby enhancing the turbulence to be detected for a more sensitive transducer at low flow rates.

If a pilot inspires 0.5 liter of oxygen per second at sea level, the average flow through the transducer chamber 10 would be, on the basis of Boyle's law, 0.1 liter per second or one fifth as much for the same mask flow owing to the reduction in pressure provided by the chest regulator 17. However, at an altitude of 30,000 feet, the cockpit would be pressurized to about 16,000 feet. The regulator 17 would then supply oxygen at approximately half of one atmosphere of pressure or approximately 7.6 p.s.i. The average flow through the chamber 10 at that altitude would be approximately 0.055 liter per second. Consequently, the microphone 20 must be sensitive to lower flow rates if it is to be used at altitude. Another application involving lower flow rates might be intensive care of an infant, or perhaps even a debilitated or immobilized adult in some cases. The direct impingement of turbulent fluid on the diaphragm of the microphone 20 makes detection of fluid flow at such lower rates possible without significantly restricting flow.

As noted hereinbefore, a ceramic microphone is preferred, not only for its small size, but also its wide frequency range (about 40 hertz to over 4 kilohertz). The lower frequency range is of primary interest for low fluid flow rates. At higher flow rates (0.5 to 5 liters per second), the predominant frequency of the microphone signal is approximately 3 kilohertz. The amplitude of the microphone signal is logarithmic and varies from approximately 20 millivolts peak to peak to 100 millivolts peak to peak at flow rates between 0.5 and 5 liters per second. For lower flow rates, the amplitude is lower so that a higher gain should be selected for the amplifier 22, preferably through a gain control switch (not shown).

A commercially available microphone in which the transducing (piezoelectric) element is lead-zirconate-titanate has been found to be suitable. Its mounting case is 2.54 m. x .635 cm. x .254 cm. and its weight is 0.75 gm. Since the case completely encloses the element in back of the diaphragm, the manufacturer has provided a vent in the rear of the case. Therefore, in mounting it in the chamber 10, care should be taken to vent that hole back into the chamber at a point removed from the area of greatest turbulence. Otherwise, the air trapped inside the microphone case will tend to load the diaphragm and degrade sensitivity at very low flow rates (about 0.1 liter per second). At higher flow rates (0.5 to 5 liters per second) no degradation of sensitivity should be noted if the microphone case is not so vented, but venting is nevertheless desirable to prevent damage thereto.

Figure 2:
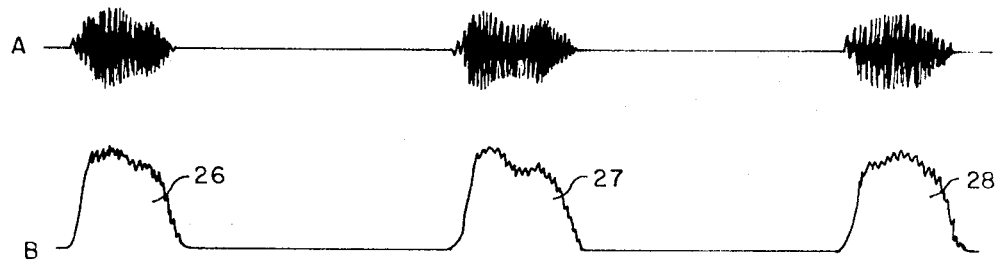
FIG. 2 illustrates waveforms of signals at points A and B of the signal conditioning apparatus of FIG. 1.

In FIG. 2, waveform A illustrates a facsimile of a signal from a microphone as recorded by a high input impedance recorder, such as an oscilloscope or an optical oscillograph. That signal is amplified and rectified by a rectifier 24 which removes half of the waveform A. A low-pass filter 25 comprising an integrator with a fast-discharge time constant removes high frequencies leaving the envelope shown in waveform B of FIG. 2. Each of the signals 26, 27 and 28 of waveform B represents a breath taken by a subject in a laboratory (at atmospheric pressure) while breathing from an oxygen mask at a rate of about 30 breaths per minute. The area under each breath signal is proportional to the volume of oxygen inspired if the amplifier 22 is designed to be linear. However, for monitoring only breath rate, and not volume, the amplifier 22 may be, for example, a high-gain amplifier which is allowed to saturate during each breath. Such an amplifier having a mid-band gain of 500 and a pass-band of from 1.7 to 3.5 kilohertz has been successfully employed.

Similar oscillograms have been obtained in flight tests. Although there was a persistent tendency for the base line to drift upwardly between breaths during such flight tests, the occurrence of each breath was distinct.

For an accurate count of the number of breaths taken and an indication of breathing rate, the breath signals of the waveform B may be counted directly or applied to a pulse shaper 29 which produces a square pulse of predetermined width and amplitude in response to each breath signal. A suitable pulse shaper may consist of a slope detector, such as an RC differentiating network having a short time constant, and a monostable multivibrator triggered by the sharp positive pulse derived from the slope detector at the leading edge of each breath signal. A counter 30, such as a multipanel decade counter, then accumulates the pulses from the pulse shaper 29. An integrator 31, such as a simple RC integrating network, having a long time constant produces a voltage signal which is proportional to the rate at which pulses are received from the pulse shaper 29. Breathing rate may then be displayed on a suitable panel 32 in response to the output voltage of the integrator 31.

The simple integrator 31 may consist of a low-pass filter comprising a resistor 33 and a capacitor 34, as shown, with a time constant that is very large in comparison with the time required for the input signal to make an appreciable change. In practice, a load resistor $R_L$ through which the capacitor 34 may tend to discharge (to maintain a constant charge across the capacitor 34 for a constant breathing rate) is the input resistance of the display unit which may be in the nature of a voltmeter suitably calibrated in breaths per unit time.

A preferred embodiment of the flow rate transducer will now be described with reference to FIGS. 3, 4 and 5. A body 35 fabricated from aluminum is drilled on one side to form an inner chamber 36. A counterbore 37 of larger diameter is then drilled and tapped, leaving a ledge around the top of the chamber 36 so that a threaded microphone housing 38 may be screwed on to seal the chamber 36. An O-ring or gasket (not shown) should be placed between the microphone housing 38 and the ledge around the chamber 36 to provide a gas-tight seal.

The microphone housing 38 is preferably fabricated by cuting a slice from a cylindrical aluminum rod and threading the slice. The thickness of the slice is approximately the same as the depth of the threaded counterbore 37. An area is then milled from the slice to provide a cavity for the microphone 40. Two holes 41 and 42 are drilled through the slice for microphone leads 43 and 44. The microphone 40 is installed in the cavity on top of a thin layer of neoprene cement. The cement secures the microphone in place and provides a shock mount. The lead holes are then sealed with epoxy.

Both ends of the body 35 are drilled and tapped to receive threaded, high-pressure fittings 48 and 49 of the type custmarily used in oxygen systems of an aircraft. The fitting 48 is adapted to be permanently attached to a high-pressure source of oxygen, while the fitting 49 is provided with a spring loaded cap 50 that is lifted to insert a quick-disconnect coupling connected to the pilot's chest regulator 17 (FIG. 1). Tapped hole 51 for the fitting 49 passes all the way through the body 35 into the chamber 36. An O-ring or gasket (not shown) is placed between the body 35 and fitting 49 to provide a gas-tight seal as the fitting 49 is screwed into the body 35 until a hexagonal flange 52 squeezes the O-ring or gasket.

The tapped hole for the fitting 48 (not shown in the figures) is preferably not drilled all the way through the body into the chamber 36. Instead, a hole 53 of small diameter is first drilled into the chamber and then a counterbore is tapped to receive the threaded end of the fitting 48. A ledge is thus left around the hole 53 in order than an O-ring or gasket may be placed thereon to seal the chamber 36 as the threaded portion of the fitting is screwed in.

All of the O-rings or gaskets are preferably made of a tetrafluoroethylene (TFE) fluorocarbon resin since there are no known solvents, except certain perfluorinated organic liquids at temperature above 299° C., and it will resist oxidation as does aluminum. However, if the transducer is to be used for fluids other than air or oxygen, the chemical reaction of the aluminum body and the microphone to the fluid should be taken into consideration. If so, a thin film of TFE fluorocarbon resin may be placed over the walls of the chamber 36, the inside wall of the microphone housing 38, and the microphone 40. In the case of the latter, the film should be placed directly over the diaphragm thereof in as thin a layer as possible in order not to degrade its sensitivity to turbulence of the fluid flow. Alternatively, the diaphragm and microphone case may be made of suitable material. The portions of the fittings exposed to the fluid should be similarly protected, or made of suitable material, such as platinum, but for oxygen, bronze or copper would be adequate.

The fitting 48 is provided with a tube consisting of: a first part 55 adapted to receive an oxygen line coupling which is slipped over it and is held in place by the main body 56 of the fitting; and a second part 57 welded to the threaded portion of the main body 56. The part 57 may be either an extension of the first part 55, or a separate part, and the end which is inserted into the cavity 36 of the body 35 is capped. A small hole 58 is drilled near the capped end to form an escape passage for the fluid. Upon screwing the fitting 48 into the body 35, care is taken to have the escape hole 58 facing the diaphragm of the microphone 40. In that manner, oxygen passes out through the escape hole 58 into the sealed chamber 36, and then out of the chamber 36 through the outlet fitting 49. The capped part 57 of the inlet tube changes the direction of flow into the microphone 40, and the latter again changes the direction of flow back to the original direction. Turbulence created at the microphone generates the signal shown in the waveform A of FIG. 2.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:
1. Apparatus for measuring flow rate of a fluid from a source to a utilization device, comprising:
   a sealed chamber including inlet and outlet passages;
   an elongated tube having one end extending well into said chamber and the other end connected to said inlet passage, said tube having a closing wall perpendicular to its longitudinal axis at said one end and an escape hole on a side of said tube near said one end;
   means for connecting said other end of said tube to said source of fluid;
   means for connecting said outlet passage of said chamber to said utilization device; and
   means responsive to the turbulence created by the abrupt change in direction of the fluid flow through said elongated tube, said means comprising a microphone mounted in said chamber directly opposite said escape hole for producing an electrical signal varying in amplitude as a function of the fluid flow rate through said chamber.
2. The combination defined by claim 1 wherein said outlet passage provides a flow direction out of said chamber substantially in line with the flow direction through said part of said inlet tube disposed along said microphone.
3. The combination defined by claim 1 used in a respiration monitor wherein said source of fluid comprises oxygen, and said utilization device comprises a face mask connected to said outlet passage of said chamber including means connected to said microphone for conditioning said signal and producing in response thereto one pulse of uniform width and amplitude for each inspiration of oxygen through said face mask.
4. The combination defined by claim 3 including means for counting said pulses.
5. The combination defined by claim 3 including means for integrating said pulses whereby said integrating means provides a measure of breathing rate.

References Cited
UNITED STATES PATENTS

| | | | |
|---|---|---|---|
| 2,936,619 | 5/1960 | Gibney | 73—194 (B) |
| 3,218,852 | 11/1965 | Scarpa et al. | 73—194 (B) |
| 2,492,371 | 12/1949 | Sivian | 73—194 |
| 3,507,146 | 4/1970 | Campbell | 73—23 |
| 1,215,135 | 2/1917 | Fisher | 73—194 (VIB) |
| 3,015,953 | 1/1962 | Peltola | 73—194 (VIB) |
| 3,144,767 | 8/1964 | Testerman et al. | 73—194 (VIB) |
| 3,232,288 | 2/1966 | Krobath | 128—2.08 |

RICHARD C. QUEISSER, Primary Examiner
M. SMOLLAR, Assistant Examiner

U.S. Cl. X.R.
128—2.08